Feb. 16, 1943.   E. S. STACK   2,311,484
WATER HEATER
Filed June 29, 1937   4 Sheets-Sheet 1
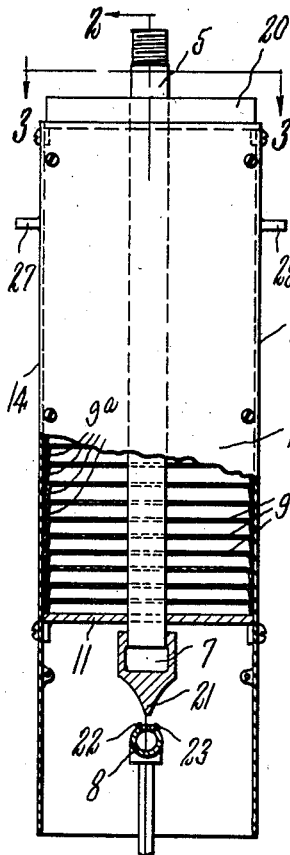

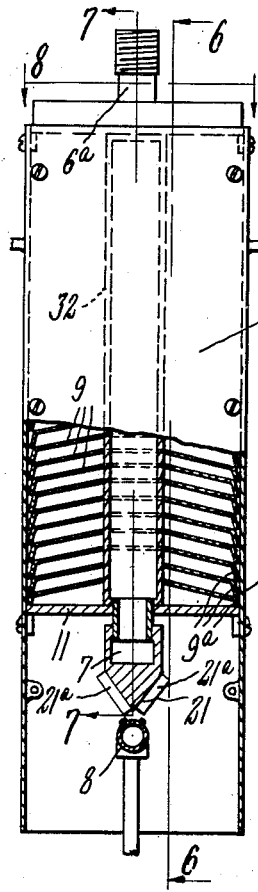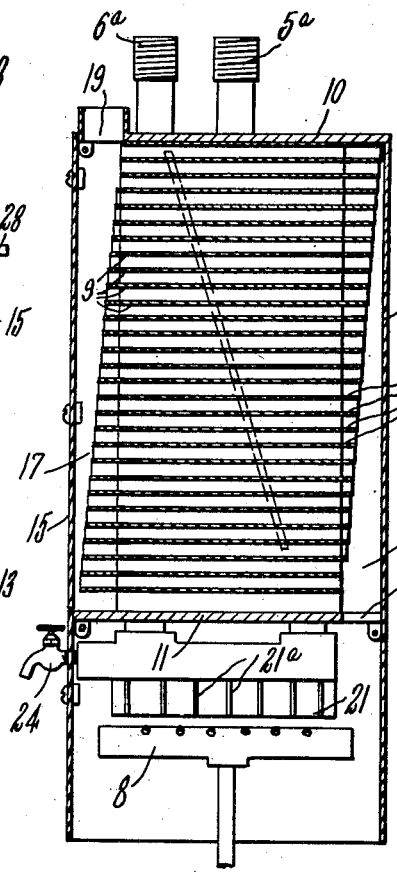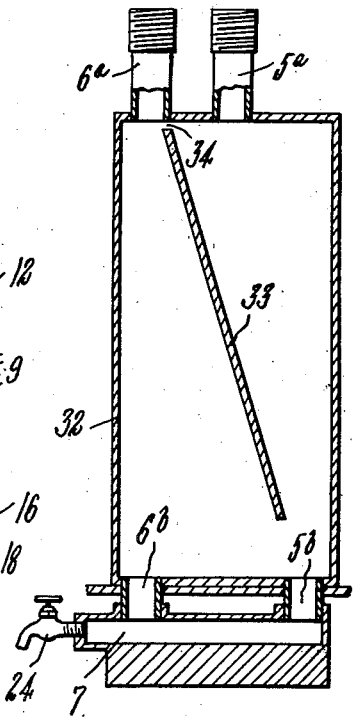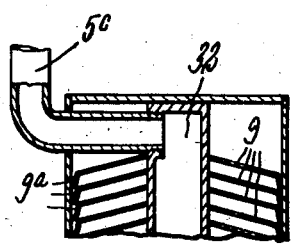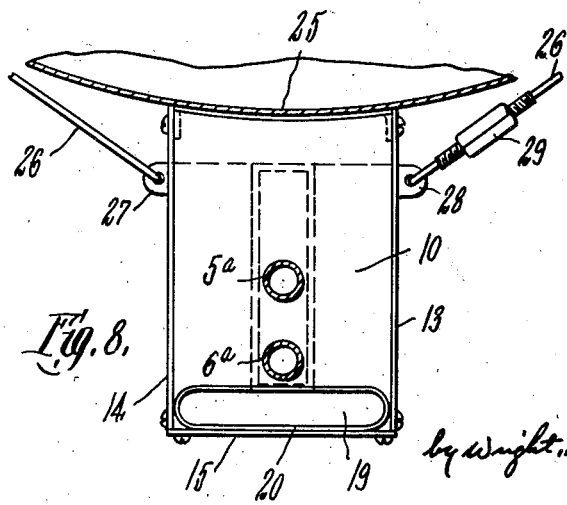

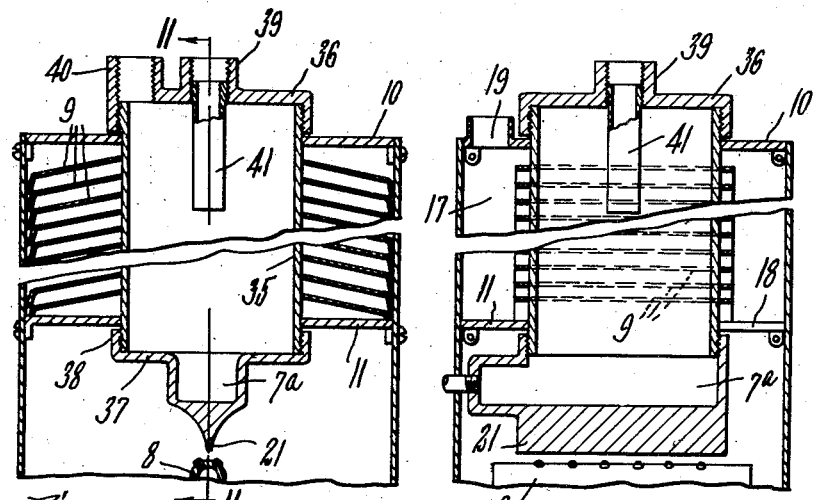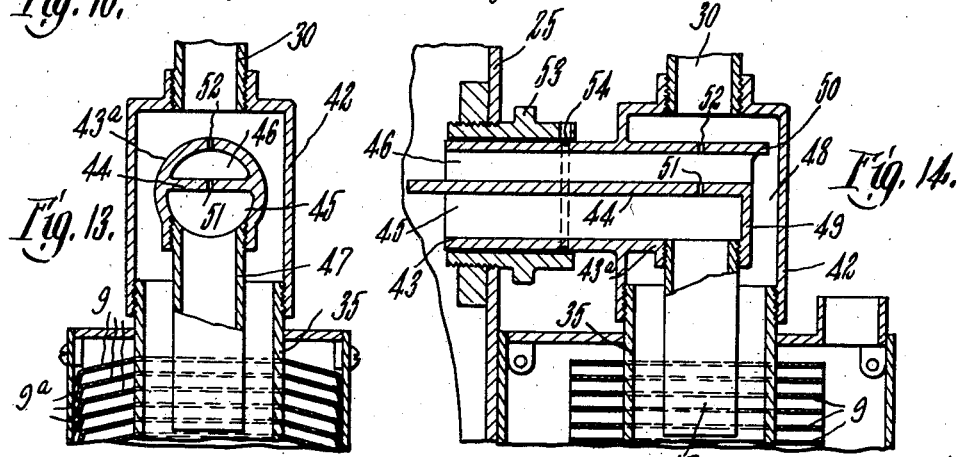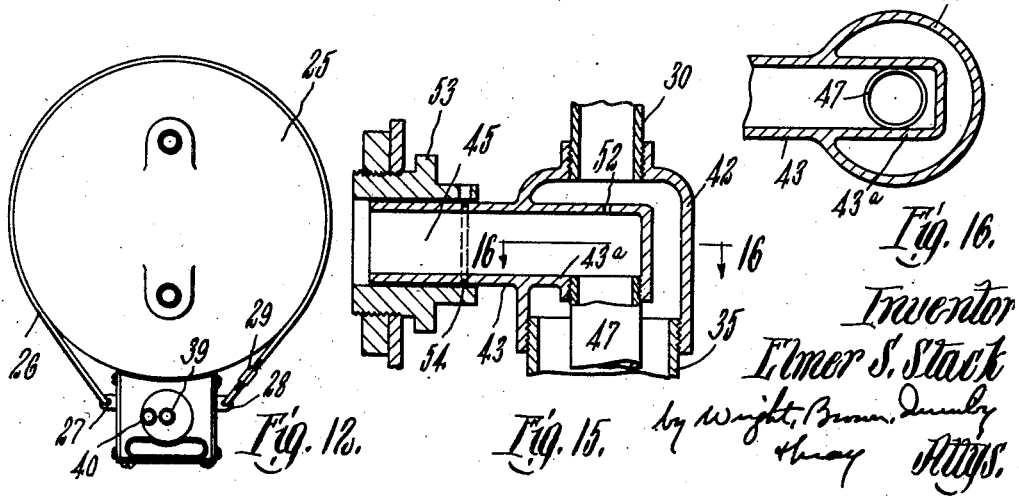

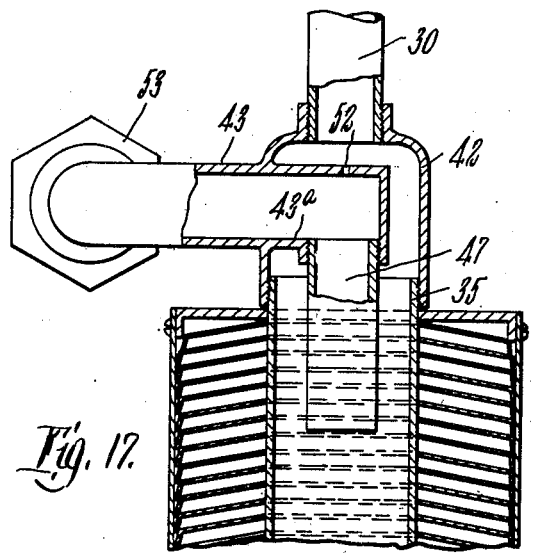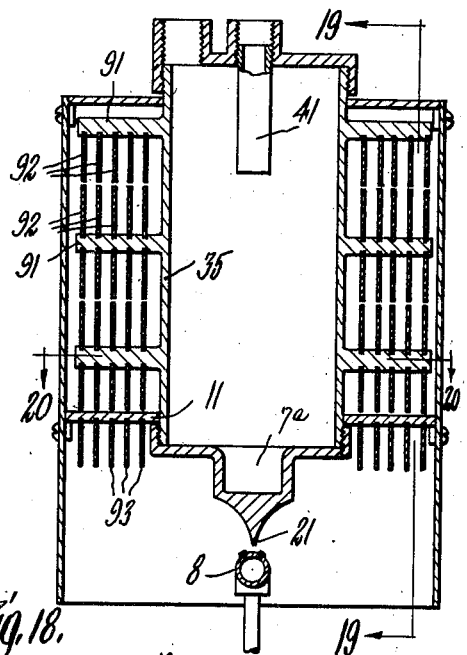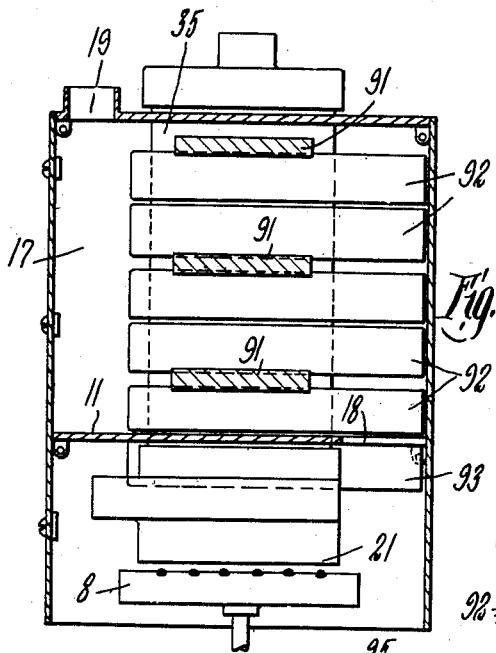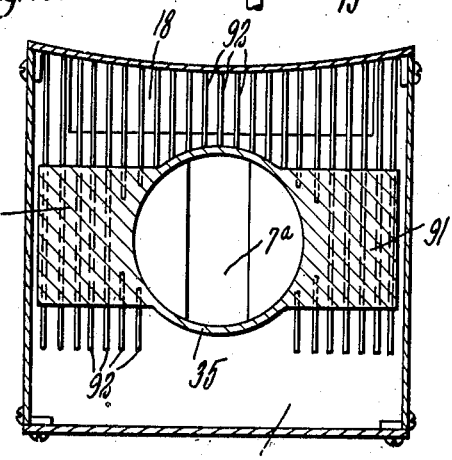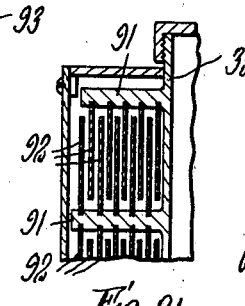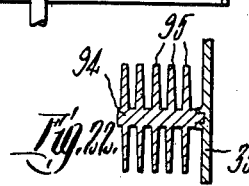

Patented Feb. 16, 1943

2,311,484

UNITED STATES PATENT OFFICE 2,311,484

WATER HEATER

Elmer S. Stack, Arlington, Mass.

Application June 29, 1937, Serial No. 150,969

15 Claims. (Cl. 122—23)

This invention relates to water heaters of the type which are used in connection with a storage tank to provide a supply of hot water for general use in homes and other places of human occupancy. More particularly it is concerned with heaters in which the source of heat is a gas flame; although some features of the invention are not limited to this heating means and are applicable to situations where heat is derived from other sources.

The main objects of the invention are to provide a heater of greater efficiency than those heretofore known; one in which the heat transfer from hot gases to water is more effectively accomplished, with less waste of heat, and particularly one having means by which the heat from the low or standby flame of a gas or oil burner is enabled to heat the water substantially. Other objects are to provide means by which heat is delivered to the water in the storage tank by direct transfer from the heating agent as well as by water circulation; to avoid condensation of water from products of combustion or the bad effects of condensation; to make all interior parts and passages through which gas flows readily accessible for cleaning; and to furnish a heater of such simple construction that it can be made and purveyed to users at low cost.

I have shown in the accompanying drawings and will describe in the following specification several forms of water heater all containing common principles and features of the invention, while differing from one another in certain secondary features and details.

In the drawings—

Fig. 1 is in part a front elevation and in part a vertical section of one form of heater, in which the water containing portion consists of two separated upright tubes and a chamber connected to the lower ends of the tubes;

Fig. 2 is a vertical section taken on line 2—2 of Fig. 1;

Fig. 3 is a plan view of the heater and a section of the inlet and outlet pipes taken on line 3—3 of Fig. 1. It shows also a portion in section of the adjacent wall of the storage tank with which the heater is used and a portion of the means for connecting the heater to such tank;

Fig. 4 is a side elevation of a common domestic hot water storage tank with the heater of the preceding figures in operating connection therewith;

Fig. 5 is a view similar to Fig. 1 showing another form of heater in which the water containing portion consists of a water section having an internal guide partition between the inlet and outlet, and a heating chamber in circulating connection therewith;

Figs. 6 and 7 are sectional views of that heater taken on lines 6—6 and 7—7 respectively of Fig. 5;

Fig. 8 is a plan view of the last named heater showing a portion of the adjacent storage tank in section on line 8—8 of Fig. 5;

Fig. 9 is a sectional view of the upper end of a heater like that shown in Fig. 5 but containing a different arrangement of the inlet connection;

Fig. 10 is a sectional view similar to Figs. 1 and 5, (except that the middle part of the heater is broken out), of a different form of heater in which the water chamber is a single pipe and the inlet includes a depending pipe section entering the top thereof;

Fig. 11 is a section on line 11—11 of Fig. 10;

Fig. 12 is a plan view of a storage tank with the heater shown in Figs. 10 and 11 applied thereto;

Figs. 13 and 14 are vertical sectional views on planes at right angles to one another of a construction of flow passages and a connector fitting by which heaters like or equivalent to those of the preceding figures may be connected with the storage tank in flow conducting relation;

Fig. 15 is a sectional view similar to Fig. 14, and Fig. 16 a detail section on line 16—16 of Fig. 15, showing a different form of flow connection in the same relationship and mechanical connection to the heater as shown in Figs. 13 and 14;

Fig. 17 is a vertical sectional view of the upper end of a water heater having flow connections like that shown in Figs. 15 and 16 in a different relationship to the storage tank;

Fig. 18 is a vertical section of a form of heater generally like that shown in Figs. 10 and 11 but having a different arrangement of heat absorption fins;

Fig. 19 is a vertical section taken on line 19—19 of Fig. 18;

Fig. 20 is a horizontal section on line 20—20 of Fig. 18;

Figs. 21 and 22 are detail sectional views showing variations in the construction and arrangement respectively of absorption fins equivalent to those shown in Figs. 18, 19 and 20.

Like reference characters designate the same parts wherever they occur in all the figures.

The water heater shown in Figs. 1–4 inclusive consists of two water sections 5 and 6, each of which is a length of pipe or tubing, a heat receiving chamber 7 connected to the lower ends of these pipe sections, a gas burner 8, heat absorption fins 9, and an enclosing casing. The casing comprises top and bottom plates 10 and 11 through which the pipe sections pass and in which they are secured, a back wall 12, side walls 13 and 14, and a removable front wall or door 15. These walls are suitably secured to the plates 10 and 11 and to one another by lugs and screws, substantially as shown in the drawings, or in any other desired way known to the art. They are sufficiently strong and rigid to enable the heater to be secured to a water storage tank in the manner presently described.

The heat collecting fins are plates of thin sheet metal such as copper, or any other metal which is sufficiently refractory and resistant to corrosion, and has sufficient heat conductivity. They are perforated to fit closely around the water tubes or sections and are passed over, or threaded upon, such sections. Their opposite longitudinal edges 9a are bent down to a substantially vertical relationship, or nearly so; forming flanges the height of which is preferably equal to the prescribed spacing between the fins. The flanges form the lateral outer boundaries of channels for hot gases between the fins, keeping the gases out of contact with the side walls of the heater, and they may be spaced away from the side walls to leave insulating spaces whereby heat radiation from the sides of the heater is reduced.

The fins terminate short of the front and rear walls of the casing, leaving unobstructed upright spaces or flues 16 and 17, the former of which registers with an opening 18 at the rear of the bottom plate 11, and the latter registers at its upper end with an outlet 19 in the top plate 10. The products of combustion from the burner 8 are prevented by the plate 11 and the lower parts of the casing walls, (which extend downward far enough to surround the burner), from flowing anywhere except through the opening 18 into the space 16. From the latter they pass horizontally through the channels between the fins into the space 17, whence they issue through the outlet 19. The outlet is surrounded by a flange 20 for connection with an exhaust pipe or tube.

It will be noted that the hot gas is subdivided by the fins into a large number of broad and shallow streams, all of which flow in contact with heat absorptive metal surfaces. The fins may be placed near together, the limit of closeness being that which objectionably chokes the flow of hot gases, and the heater may be made high enough to provide any desired number of fins, whereby substantially all of the available heat of the gases is transferred to the water. The fins may be soldered to the water sections, or the holes in them may be of dimensions to fit tightly around the water sections, or they may be engaged with or fastened to the sections in any other manner which obtains good heat conductivity.

The heat receiving water chamber 7 is located beneath the plate 11 and is provided with a downwardly projecting fin 21 in the middle of its bottom extending its whole length. This part of the heater is preferably made as a metal casting of which the fin 21 is an integral part and the sides of the fin diverge upwardly from its lower edge to the full width of the casting. As here shown, these sides have a concave curvature to deflect the rising currents of air and gases from the burner with a minimum of eddy disturbance, but this is a non-essential detail. The burner is located below the fin and is provided with two rows of jet outlets 22 and 23 on opposite sides of the vertical plane containing the apex of the fin, and the axes of the jet outlets at each side of such plane are substantially parallel to the adjacent side of the fin. An important feature of the invention is that the burner is so close to the fin that when the fuel supply is reduced to the minimum, or to any other degree between the maximum and the minimum or standby flame supply, the flames from the jet openings will still deliver appreciable quantities of heat to the fin and to the water within the chamber. The distance from the upper side of the burner to the lower edge of the fin is in the order of ⅛" more or less, depending on how much gas is supplied for the standby flame. This amount is determined in accordance with the capacity of the storage system and the normal demand on the system for hot water so that, when no water is being drawn, the water in the tank will be kept warm but will not be heated enough to run the risk of generating steam. This construction and combination of fin and burner causes the flames to project parallel to the inclined sides of the fin, without impinging and depositing carbon on the fin, however high or low the flames may be, and permits the secondary air for combustion to flow between and around the jets of the burner in sufficient measure to effect complete combustion, but excludes possibility of an excessive amount of cool air sufficient to form a blanket or layer between the flames and the fin and impede transfer of heat to the latter. Some of the secondary air which flows between the jets of flame from each side of the burner passes also between the flames and the surfaces of the fins. The intervening thin layer or film of air aids in preventing direct impingement of the flames on the fin, supplementing the effect due to the outward inclination of the burner orifices. This burner may be like the standard gas burners for water heaters in having an air tube entering its under side surrounding the gas supply nozzle, through which primary air is drawn to mix with the gas before combustion; or may equally well be of what is known as the luminous flame type.

The combination thus described maintains a relatively constant distance between the flames and the sides of the fin, whence it follows that the percentage of heat absorption by the fin is substantially the same regardless of the rate of fuel supply and combustion. It also prevents reverse circulation of the water when the flame is turned low, because the heat of even the lowest flame prevents the water in the chamber from being chilled. In heaters where a wide distance is provided between the burner and the nearest heat-absorbing surface to prevent deposition of carbon, reduction of the flame to the minimum allows cool air to flow in contact with the heater, chilling the water and causing reverse circulation between the heater and tank with consequent chilling of the water stored in the tank. My invention causes the stored water to be kept warm without wasteful consumption of fuel.

The concave form of the sides of the fin 21 is not a vital feature, and these sides may be made as convergent inclined planes. It is also within the contemplation of this invention to provide secondary fins on the inclined sides of the main fin to enhance the efficiency of heat conduction.

This variation is illustrated in Figs. 5 and 6, in which the secondary fins are shown at 21a. They may be cast integral with the water chamber, or may be soldered to the inclined bottom planes thereof, and are preferably located in vertical planes perpendicular to said inclined bottom planes, midway between the jet outlets of the burner. The secondary fins establish channels through which the products of combustion from the burner jets flow; and they assist in restricting the amount of air capable of passing between the hot gases from the burner when turned low and the sides of the main fin. Only a layer of air so thin that it is quickly heated can pass next to the sides of the main fin, and this is prevented from becoming stagnant by the scouring effect due to the inclination of the sides of the fin. The secondary fins may be applied in this relationship in all the forms of heater here shown, although they are illustrated only in Figs. 5 and 6. However, appreciable heating by low flames, even when the flames are turned down to the minimum or standby proportions, is obtained when the secondary fins are absent.

One end of the chamber 7 extends near to the front wall of the casing and is provided with a tap 24 for draining the heater.

The rear wall 12 of the casing is made concave on its outer side to fit the curvature of the storage tank 25; and the heater is mounted in use with the rear wall close against the lower part of the storage tank in heat-transmitting contact with the wall of the tank, substantially as shown in Figs. 3 and 4. It is held in place by the pipe connections with the tank and also by a strap or rod 26 which is connected at one end to a lug 27 on one side of the heater, and is passed around the tank and connected to a lug 28 on the other side of the heater by a turn buckle 29. Owing to the close contact thus made between the heater and tank, there is a direct transfer of heat from the passage or flue 16 at the back of the heater into the water in the tank. In thermal effect the rear wall 12 is virtually a part of the tank wall, and, in respect to this phase of the invention, may be omitted. This utilizes the heat which would be dissipated from the back of the heater if separated from the tank in accordance with usual practice. It is of value under all conditions, and particularly so when the burner is turned down to the low standby flame; the volume of products of combustion being then too small to have much heating effect on the water in the sections 5 and 6. The products of combustion at such times rise through most of the height of the passageway 16 before flowing to the front through the horizontal channels and, being in thermal contact with the tank wall and of high temperature though small volume, they have an appreciable heating effect directly on the water in the tank.

Connections for circulation of water between the heater and tank are made by the pipe 30 and the fitting 31 at different levels in the tank, as usual. Both connections with the heater are made at the top of the heater, which is different from the usual practice. However, the greater density of the relatively cool water in the tank over that of the warmer water in the pipe 30 causes a circulation, when the system is in operation, with down flow through the heater section 5 and upflow through the section 6. When the system is put in operation with all parts at the same temperature, circulation is started in the desired direction by reason of the fact that the eduction section 6 is of smaller diameter or has thinner walls than the induction section 5, or may be both smaller in diameter and thinner of wall, whereby the water therein is heated more quickly than that in the other section.

This manner of construction and water connection obtains the desirable effect of substantially eliminating condensation, and wholly eliminating the bad effects of condensation, on the parts of the heater of the water vapor in the products of combustion. The incoming cold water is progressively heated as it travels downward until its temperature in the lower part of the section 5 is higher than the dew point of the vapors. Such condensation as occurs on the upper levels of the sections and the fins adjacent thereto when the system is first put into operation with all parts full of cold water travels outwardly to the hotter areas of the fins and is immediately evaporated. Water of condensation does not collect in sufficient quantities to drip to lower levels. After the water in the delivery side of the heater has first been well heated, no appreciable condensation occurs in further operation.

The section 6 through which the hot water rises and leaves the heater is exposed to the hottest gases; i. e., those which rise in the rear flue. A progressive heating of the water occurs from the time it enters until it leaves the heater, its final temperature being not greatly below the temperature of the exhausted flue gases. The products of combustion after passing the outflow section 6 pass the inflow section 5 and deliver still more of their heat to the colder water therein. Thus more heat is put into the water and less heat wasted in the discharged gases than would be the case if the cold water were admitted to the bottom of the heater.

The heater shown in Figs. 5–8 inclusive differs from that first described in the following respects.

In place of two separated pipes forming the water-containing part, or water section, the main body of the heater consists of a single box-like section 32 resting on the bottom plate 11 of the heater casing, into the top of which inlet and outlet pipe fittings 5a and 6a respectively open and the bottom of which is connected by couplings 5b and 6b respectively with the heating chamber 7. A partition 33 is established in this water section extending from one side wall thereof to the other and extending downward from a point near the top to a point well above the bottom of the section so that it divides the interior of the section into two chambers which communicate with one another at the bottom. The inlet pipe fitting 5a opens into one of these chambers and the outlet pipe fitting 6a leads from the other. The partition is inclined so that the upper end of the chamber from which the outlet 6a leads is substantially larger and has a greater area of enclosing wall surface than the corresponding part of the other chamber. More heat is thus delivered to the chamber from which the hot water outlet leads, whereby the water circulation is started in the proper direction when the system is first put in operation with all parts at the same temperature. A vent 34 is provided at the upper end of the partition to prevent formation of an air pocket in the top of the receiving chamber, by allowing any air liberated from the entering water to flow out with the delivered hot water.

Another feature first shown in the form of heater now being described is a stepped arrangement of the absorption fins 9, according to which each fin at a higher level is extended further toward the rear and across a larger proportion of the width of the rear uptake flue 16 than the fins at lower levels, and the fins at lower levels are extended further toward the front wall of the heater than those at higher levels. This arrangement appears in Fig. 6. It provides a measure of control of the division of hot gases among the channels between the different fins. Gases rising in the upright space or flue at the rear of the heater are deflected successively by the rearwardly projecting edges of the fins at successively higher levels. By a just apportioning of the projecting ends, a substantially equal distribution, or any other desired proportional distribution, of the gases among the several horizontal channels may be effected. This feature is not necessarily exclusive to the form of heater here shown, but may be combined equally well with that shown in Fig. 2, and others yet to be described. Conversely, the heater having a single section like that here shown may be provided with fins which terminate at their rear ends in vertical alinement, as shown in Fig. 2. Either the overhanging stepped arrangement at the rear or the underlapping stepped arrangement of fins at the front of the heater may be used, in any embodiment of the invention, independently of the other. The stepped arrangement at the front provides an increase of heating surface over the arrangement where the front edges of the fins are in vertical alinement, without impeding the flow of gases.

Another difference shown in the form of heater now being described is that the fins are so formed as to slope downwardly from their points of contact with the water section to their outer edges. The effect of the sloping arrangement is to cause the gases delivered from the low or standby flame, which are of small volume in comparison with those generated by the full flame, to rise into contact with the sides of the water section when flowing from the rear to the front part of the heater. Thus they deliver heat not only to the fins but also directly to the side walls of the section, and heat is conserved and usefully applied even when the products of combustion are so small in volume as to impinge on only a small proportion of the area of the fins. Where, as here shown, the width of the water section from front to rear is as great, or nearly as great, as the length of the fins, the fins at either side of it are nearly or wholly separate from one another. In this case then it is practically necessary to secure their inner edges to the sides of the water section by solder or other suitable means.

In all other respects, including the burner and lower heating chamber combination, and direct contact between the rear wall of the heater and the storage tank, this heater is identical with that first described and its parts are designated by the same reference characters.

Fig. 9 shows a modification of the heater shown in Figs. 5–8 consisting in the location of the water inlet connection 5c at one side of the heater so that it enters the side of the water section 32 instead of entering through the top wall thereof. It is, however, located at the upper end of the water section as before whereby the same manner of water circulation is obtained. This arrangement of the inlet permits flexibility in the manner of connecting the heater to the storage tank. The inlet may be straight, or may be bent at an angle as shown, and be of any length, and is, or may be, swiveled in the side of the water section. Thus it can be arranged in any manner needed to avoid obstructions, whether such an obstruction is on the tank or is created by the hot water connection between the heater and tank.

In the heater embodiment shown in Figs. 10, 11 and 12, the water section 35 is circular in cross section and may be made of a length of pipe or tubing of relatively larger diameter than the tubes 5 and 6 of the heater first described. Its ends are closed by heads 36, 37, of which the lower head is so formed as to contain a chamber 7a like the heating chamber of the two forms of heater previously described with a fin 21 on its bottom extending from front to rear parallel to the burner. In this case the chamber 7a is open to the interior of the main section throughout so much of its length as corresponds with the diameter of the tube 35. It has an extension at one end for connection with a draw-off tap 24a, and a flange 38 at its upper side adapted to be screwed on to the end of the tube.

The upper head 36 has a threaded nozzle 39 in its center for connection with an inlet pipe and a nozzle 40 near its circumference for connection with an eduction pipe. A tube 41 extends downward from the inlet nozzle 39, forming in effect a short extension of the supply pipe to keep separate the incoming cold or cooler water from the delivered hot water. This prevents condensation on the outer surface of the water section because the entering water is warmed by the previously heated water in the upper part of the water section to a temperature above the dew point of the gases before it arrives at the bounding walls of the section. Water circulation is started in the desired direction when the heater is first put in operation by reason of the fact that the water which can flow freely to the outlet connection is heated before heat can reach the cold water in the inlet pipe. The fins here have the same downward and outward inclination from the water section to their outer flanged edges as shown in Fig. 5. The same character of inclination may likewise be given to the fins in the heater which has two tubular water sections shown in Figs. 1–3; for this formation has utility of the same nature in all forms of heater. So also the rear ends of the fins in the heater forms shown in Figs. 10–17 inclusive may have the same, or equivalent, stepped arrangement as that shown in Fig. 6. The heater last described is designed to be applied to a tank as shown in Fig. 12, with circulating connections substantially like or equivalent to those shown in Fig. 4.

Figs. 13 and 14 illustrate a type of inlet and outlet fitting, and means of connection to the storage tank, which may be applied to the heater of Figs. 10 and 11, instead of the head 36 with separate nozzles for connection to separate pipes. This alternative fitting, comprehensively designated by the reference number 42, is screwed on to the upper end of the pipe which forms the body of the water section, and has an internally tapped flange on its upper end for connection with the outlet pipe 30 (Fig. 4). It is also provided with a lateral branch 43 divided by a horizontal partition 44 into parallel passages 45 and 46. An inward extension 43a from the lateral branch projects within the fitting and has a threaded opening at the under side of its inner end in which is mounted a tube 47 concentric with the pipe section 35. The inner end of the inward extension terminates short of the opposite wall of the fitting, leaving a passage 48 through which hot water may flow past the end of the inward extension, as well as around the sides of it. The lower passage 45 is closed at its inner end by a wall 49, while the inner end of passage 46 is open, and a ledge 50 projects from the upper side of the extension part way across the passage 48.

When the heater is assembled with the storage tank, the branch 43 enters the side of the tank and is made leakage tight. Water circulation then takes place through the passage 45 and tube 47 downwardly into the water section of the heater, thence upward through the annular space of the water section around tube 47, and through the main body of the fitting 42 and outlet pipe 30 to the upper part of the tank. A part of the water which flows through the passage 48 is deflected by the lip 50 and delivered by the upper or branch passage 46 into the tank. Vents 51 and 52 are formed in the partition 44 and in the top wall of the inward extension to prevent collection of air and blocking of the water circulation. The value of the branch passage 46 is that it provides a second path for circulation of water when no hot water is being drawn from the system, preventing liability of over-heating the water when a heater of large capacity is used in the system. When no water is being drawn, the accumulation of heat in the tank causes the water to be heated to progressively lower levels. This causes the density and specific gravity of the water in the upper part of the tank to be reduced, and to approach more nearly the specific gravity of the water in the rising circulating pipe 30. Hence the circulation becomes more sluggish with the possibility of overheating the water before the tank thermostat is operated to reduce the fuel supply to the burner. That is, in the absence of such a channel as the passage 46, such liability exists. But the passage 46 provides a secondary channel for circulation through which hot water may pass to substantially cooler water in the low levels of the tank, causing a more rapid flow of cooler water to the heater and also shortening the time interval before the water at the level of the thermostat is warm enough to cause the fuel supply to be shut down. But this branch passage does not appreciably affect the flow of hot water through the up-take pipe 30 when water is being withdrawn, or after the water in the upper portion of the tank has been reduced in temperature.

The fitting shown in Figs. 15 and 16 is like that just described except that the lateral branch has no internal partition and no passage for conducting a part of the hot water directly into the tank. But it is otherwise constructed and arranged in the same way to cause the same water circulation, and its corresponding parts are designated by the same reference characters.

I have shown in Figs. 14, 15 and 17 a novel connection for securing the branch 43 or its equivalent in adjusted position and fluid tight union with the tank. This connection is a bushing or nipple 53 which is externally threaded and screwed into a tapped hole and into the reinforcement for such hole in the side of the tank. The bore of the bushing is of a size to make a slip fit with the branch connection. The latter is slipped into the bushing and adjusted until the back of the heater bears against the side of the tank, whereupon solder is flowed between the bushing and branch tube to hold the latter fast and close the intermediate space against leakage. The solder seal is easily effected by coating the branch tube with a flux before insertion, and heating the nipple with a blow torch after adjustment of the heater and applying solder in the form of a fine wire or thin strip to the crack between the branch and bushing. The solder, being fed in sufficient quantity as it melts, flows entirely around the branch pipe and fills the intervening space within the bushing. If desired, a groove 54 or a plurality of such grooves may be formed in the outer surface of the branch tube or the inner surface of the bushing to accommodate a larger supply of solder.

This mode of connection may be used with any form of tube or pipe projecting horizontally from the heater, including that shown at 31 in Fig. 4 and the horizontal upper end of the pipe 30. It greatly simplifies the task of assembling the horizontal tubes or fittings of the heater with the tank and of packing the joints between them.

The connection between the heater shown in Fig. 17 and the tank is like that shown in Figs. 15 and 16 except that the lateral branch 43 has a bend in it. Its extremity beyond the bend is entered into the bushing and secured in it as described.

It is to be understood that the heaters partially shown in Figs. 13–17 inclusive are, or may be, as to the parts not shown, identical with that shown in Figs. 10–12.

Figs. 18, 19 and 20 show a form of heater in which the water section is formed with integral, horizontal fins 91 spaced widely apart and having grooves in their faces in which the edges of sheet metal fins 92 are placed and secured. The sheet metal fins are located in vertical planes, or substantially so, and they subdivide the spaces between the horizontal fins into vertical channels. They also extend across the space between the rear wall of the heater casing and the water section, to abstract heat from the gases rising in that part of the casing. The fins 92 divide the hot gases into vertical slices rather than substantially horizontal layers, as in the arrangements previously described. They bring heat conductive metal into contact with small subdivisions of the gas stream and so effectively extract most of the available heat. The horizontal fins 91 have sufficient dimensions and mass to conduct heat from the fins 92, as rapidly as it is collected by the latter from the gas, to the walls of the water section.

In this same heater I have shown fins 93 connected to the under side of the bottom plate 11 of the heater casing disposed to collect heat from the gases adjacent to the burner and deliver more heat to and through the bottom plate and to the water section than is collected by direct impingement of the gases on the bottom plate. Similar fins may, within the scope of the invention, be provided with all the forms of heater previously described. In all forms the bottom plate is close to the source of heat, receives heat from the products of combustion delivered from the burner, and conducts heat to the water section. Its conductive effect in any case may be enhanced by the combination of fins with it as described.

Fig. 21 shows a combination of horizontal and vertical fins in which the fins depending from one horizontal fin are interleaved with those rising from the next lower horizontal fin, so that the vertical fins of both sets overlap one another. In this way the spaces through which hot gases flow are still further and more narrowly subdivided with a more complete extraction of heat, other things being equal.

Fig. 22 shows a combination of horizontal and vertical fins 94 and 95 made as an integral casting adapted for application to the sides of a water section, as by a tongue and groove engagement and a soldered joint. This unit corresponds to either one of the horizontal fins 91 and the fins 92 connected to the upper and lower sides thereof in the construction of Figs. 18–21. The upright fins of the unit casting are parallel to one another, and the edge of the assemblage which is joined to the water section may be curved to fit a curved water section or straight for application to one having straight sides, such as that shown in Figs. 5–9 inclusive.

The heater of Figs. 18–22 is adapted to be combined with a storage tank as described in connection with Figs. 10–12, or with the use of either alternative fitting shown in Figs. 13–17.

Features common to all forms of the invention herein described are the following:

(a) In each case the back of the heater is applied directly against a wall of the storage tank so that direct conduction of heat occurs from one to the other.

(b) The water section includes a bottom portion having a downwardly projecting fin in close proximity to the burner and between two flames of the burner in an arrangement which effects heat conduction from the flame even when turned low, avoids deposition of carbon on the sides of the fin, and prevents heat insulation by a blanket of cold air.

(c) The products of combustion are prevented from rising except in a passage at the back of the heater, and thence they flow to the outlet at the front of the heater with only one change of direction. This insures a good draft and free flow with a minimum of baffling. But at the same time the streams of gas are entered by thin fins of high heat conductivity in numerous planes so close together that all parts of the gas stream are caused to deliver heat through good conducting paths to the water.

(d) The interior of the heater is easily accessible for cleaning. The removable front door or front panel 15 can be taken off, which exposes all of the fins and the channels between them at the front end, enabling solid deposits on the fins and the sides of the water sections to be displaced to the rear by a brush, scraper or blast of air, and to drop through the space 16 and opening 18 in the bottom plate at the rear of the heater.

What I claim and desire to secure by Letters Patent is:

1. A gas water heater comprising an upright water containing portion, a fin depending from the bottom of said portion, lateral heat collecting fins at the sides of the water containing portion extending substantially horizontally from front to rear, a burner beneath the first named fin, a casing enclosing the before named parts and having side walls close to the outer side edges of the lateral fins, the front and rear walls of the casing being spaced away from the relatively adjacent ends of the lateral fins sufficiently to afford uptake passages for products of combustion from the burner, and an impervious plate beneath the lateral fins having an opening at its rear, whereby the products of combustion are enabled to rise in the rear uptake passage and to flow through the channels between the lateral fins to the forward uptake passage in the casing, the casing having an outlet from the upper end of said front passage.

2. A gas water heater comprising a water containing portion having inlet and outlet connections, fins in heat-conducting relation with said water containing portion extending laterally therefrom and being substantially horizontal in the front to rear direction, a casing enclosing said fins having side walls close to the lateral edges of the fins, and being otherwise constructed and arranged to provide front and rear uptake passages for products of combustion, a burner beneath said water containing portion, a baffle member beneath the fins arranged to cause products of combustion from the burner to flow into the rear uptake passage, the casing having an outlet from the upper end of the front uptake passage, whereby the products of combustion are caused to flow from the rear uptake passage forwardly through the channels between the fins.

3. A water heater comprising a water container having a fin depending from its bottom, a burner located close to and beneath the fin having a row of separated jet orifices on each side of the vertical plane containing the apex of the fin, the orifices of each row being directed at an inclination upwardly and away from said plane whereby to cause the flames therefrom to deliver heat to the fin without impingement on the surfaces thereof; the burner being so close to the fin that heat is transmitted thereto by the flames when reduced to the minimum volume.

4. In a gas water heater, a water container having an elongated chamber at its bottom and a fin formed with downwardly convergent sides dependent from the bottom wall of said chamber combined with a burner located symmetrically beneath the fin having two rows of jet orifices located one at each side of the vertical plane through the apex of the fin, the axes of the holes at each side of said plane being substantially parallel to the nearer side of the fin, and the burner being near enough to the fin to deliver heat thereto when the flames from the jet orifices are reduced to the minimum volume.

5. A water heater comprising a water container, fins extending laterally to either side of said container in substantially horizontal arrangement one above another with spaces between them, the outer margins of the fins having flanges extending across such spaces and forming lateral boundaries thereof, upright walls spaced apart from the opposite ends of the fins to form rising flues in communication with the spaces between the fins, and a burner so arranged as to deliver products of combustion into the lower part of one of said flues, the other flue having an outlet from its upper end.

6. A water heater as set forth in claim 5, in which the fins are inclined upwardly from said flanges to the water container.

7. A water heater as set forth in claim 5, in which the fins at higher levels extend partially across the flue into which products of combustion are delivered from the burner to a greater extent than fins at relatively lower levels.

8. A water heater comprising a water container divided into two portions, an inlet connection for water from an external source to be heated leading into the top of one of said portions, an outlet connection for heated water leading from the top of the other of said portions, combined with a burner at a low level with respect to said water container, and guiding means forming channels for products of combustion delivered by the burner arranged to conduct such products upwardly adjacent to that portion of the water container from which the outlet connection leads and thence substantially horizontally in thermal contact first with the portion of the water container from which hot water is delivered and next in thermal contact with that portion to which water to be heated is admitted.

9. A water heater comprising a water container, a burner, an inlet connection to the top of the water container to receive cold water from an external source, an outlet connection from the top of said container, guiding means for compelling down flow of water in its passage between the inlet and outlet, and guiding means for causing flow of products of combustion from said burner in paths which bring the hottest products of combustion into thermal contact with the water adjacent to the outlet.

10. A water heater comprising a water container having an inlet for connection with a source of cold water and an outlet both in its top portion, said inlet being arranged to compel water entering through it to come into thermal contact with the hot water adjacent to the outlet, while preventing mixing of the inlet water with such hot water, a burner, and means for guiding the products of combustion from said burner in paths which cause such products of combustion to deliver heat into the hottest water in the heater before coming into thermal contact with the colder entering water.

11. A water heater comprising a water container having inlet and outlet connections for water, fins in heat conducting connection with said water container projecting laterally therefrom and extending substantially horizontally in the front-to-rear dimension of the heater, with spaces between them to provide intermediate gas conduits, substantially vertical fins secured to certain of said lateral fins in said gas conduits and also extending in said front-to-rear dimension with a lateral spacing between them sufficient to permit passage of hot gases, a burner beneath said water container, and enclosing means providing rising flues adjacent to the front and rear ends respectively of said fins communicating with said gas conduits, one of said flues being open to receive products of combustion in its lower portion from the burner and the other flue being open in its upper portion for discharge of said products.

12. A water heater comprising a water container, heat absorbing fins connected to said container in generally horizontal arrangement with spaces between them for passage of a heating agent, a heat generator below said container and fins, means causing hot fluid from said generator to flow through said spaces in contact with the fins, a connection arranged to lead cold water to be heated from an external source into the top of the water container, a hot water outlet leading from the top of the container, and means for conducting water from the inlet connection downwardly through the water in and adjacent to the outlet connection.

13. A water heater as set forth in claim 12 having means for venting the portion of the water container into which the inlet opens.

14. A water heater comprising a water container having a hot water outlet at its top, a heat generator beneath said container, conducting means arranged to lead hot fluid from said generator past the water container in heat transmitting contact therewith adjacent to the outlet, an inlet in the top of said container for connection with a source of cold water, interior means in the container for causing flow of water downward from the inlet before passing to the outlet, and means for venting the portion of the water container into which the inlet opens.

15. A water heater comprising a water container having inlet and outlet connections, fins in heat conducting connection with said water container projecting laterally therefrom and being substantially horizontal in the front to rear direction, said fins being separated vertically from one another to provide intermediate substantially horizontal gas conduits, means for substantially closing the outer sides of such conduits, bounding means at the front and rear of the heater separated from the ends of the fins to form rising flues into which the opposite ends of the before-named conduits respectively open, and a burner arranged to deliver products of combustion into the lower part of one flue, the other flue having an outlet from its upper part, the fins being disposed with an upward slope from their lateral extremities to the water container whereby to cause the products of combustion, when insufficient to fill said conduits, to pass through those portions of the conduits which are next to the water container.

ELMER S. STACK.